United States Patent [19]

Dimitri et al.

[11] Patent Number: 5,377,121
[45] Date of Patent: Dec. 27, 1994

[54] AUTOMATED STORAGE LIBRARY HAVING INVENTORY AT PICKER LEVEL

[75] Inventors: Kamal E. Dimitri; Dennis L. Willson, both of Tucson, Ariz.

[73] Assignee: International Business Machines Corporation, Armonk, N.Y.

[21] Appl. No.: 258,354

[22] Filed: Jun. 10, 1994

Related U.S. Application Data

[63] Continuation of Ser. No. 770,375, Oct. 3, 1991, abandoned.

[51] Int. Cl.$^5$ ............................................. G11B 15/00
[52] U.S. Cl. .................................... 364/478; 369/34; 369/36; 369/39
[58] Field of Search ..................... 364/478; 360/71, 92, 360/101; 369/33, 34, 35, 36, 38, 39; 395/275, 425; 414/273, 786

[56] References Cited

U.S. PATENT DOCUMENTS

| | | | |
|---|---|---|---|
| 4,271,489 | 6/1981 | Siryj et al. | 369/38 |
| 4,527,262 | 7/1985 | Manto | 369/33 |
| 4,614,474 | 9/1986 | Sudo | 414/281 |
| 4,654,727 | 3/1987 | Blum et al. | 360/71 |
| 4,766,581 | 8/1988 | Korn et al. | 369/30 |
| 4,823,256 | 4/1989 | Bishop et al. | 371/9.1 X |
| 4,864,438 | 9/1989 | Munro | 369/34 X |
| 4,864,511 | 8/1989 | Moy et al. | 364/478 |
| 5,121,483 | 6/1992 | Monahan et al. | 395/275 |
| 5,128,912 | 7/1992 | Hug et al. | 369/34 X |
| 5,164,909 | 11/1992 | Leonhardt et al. | 369/36 X |
| 5,214,768 | 5/1993 | Martin et al. | 395/425 |

FOREIGN PATENT DOCUMENTS 0426189 11/1990 European Pat. Off. .
9007182 6/1990 WIPO .

*Primary Examiner*—Roy N. Envall, Jr.
*Assistant Examiner*—Brian C. Oakes
*Attorney, Agent, or Firm*—M. W. Schecter

[57] ABSTRACT

An optical disk having its disk inventory at the picker level is disclosed. The library includes two library controllers and four pickers. Each library controller maintains a list of the storage media in the entire library, but has no disk location inventory. The library controllers are not coupled to each other. Each picker has exclusive access to a set of storage cells and internal peripheral storage devices. In addition, the picker controller for each picker maintains the disk location inventory for the disks accessible by such picker. During a failure condition which prevents one library controller from accessing a particular storage medium, the other library controller can be signalled to attempt to access such storage medium. The overhead associated with maintaining two identical copies of the inventory in the library controllers is therefore eliminated.

12 Claims, 4 Drawing Sheets

AUTOMATED STORAGE LIBRARY HAVING INVENTORY AT PICKER LEVEL

The application is a continuation of application Ser. No. 07/770,375, filed Oct. 3, 1991, now abandoned.

BACKGROUND OF THE INVENTION

1. Field of the Invention

The present invention relates to an automated storage library having the inventory of its contents at the picker level. More particularly, the present invention is an automated storage library having a plurality of library controllers and pickers with the library inventory maintained in the picker controllers to permit any library controller to access any storage medium in the library without knowledge of the storage cell or drive in the library in which the storage medium resides.

2. Description of the Related Art

The main components of a computer system includes host processors, input/output (I/O) devices, and storage. Processors are the brain of computer systems, performing arithmetic and logical operations. I/O devices permit data to be input to or output from the system. A keyboard is an example of an input device and a printer is an example of an output device. Storage includes means for temporarily and permanently storing information, including user data and the instructions which direct computer operations. Storage may be within a processor, such as an integrated circuit main memory, or may be peripheral thereto, such as magnetic disks, magnetic tapes, and optical disks. A machine used to write to and read from such peripheral storage is known as a peripheral storage device and typically includes a device controller for translating processor commands into the physical actions of the device itself. Each of the computer system components may be divided into subcomponents and may be distributed across various locations within the computer system.

It is inefficient to store all of the data in a computer system on a single type of storage. Storing all data in main memory is too costly and storing all data on peripheral storage reduces performance. Thus, a typical computer system includes both main memory and one or more types of peripheral storage arranged in a data storage hierarchy. As the need for storage has increased, automated storage libraries have been developed to manage the storage of removable data storage media.

Automated storage libraries include a plurality of storage cells for retaining disks, tapes, or the like, a robotic picker mechanism, and one or more internal peripheral storage devices. Each storage medium may be contained in a cassette or cartridge for easier handling by the picker. The picker operates on command to transfer the storage media between the storage cells and internal peripheral storage devices without manual assistance. Once a storage medium is mounted in a peripheral storage device, data may be written to or read from that medium for as long as the system so requires.

Several automated storage libraries are shown. IBM Corporation introduced the 3850 Mass Storage Subsystem for the storage and retrieval of magnetic tape modules in the 1970's. More recently, several firms have introduced automated storage libraries for magnetic tape cartridges and optical disk cartridges. For example, magnetic tape cartridge libraries are disclosed in U.S. Pat. Nos. 4,654,727, 4,864,438, and 4,864,511. Examples of optical disk libraries can be found in U.S. Pat. Nos. 4,271,489, 4,527,262, 4,614,474, and 4,766,581. These libraries are designed to attach to a computer system in which a host processor maintains an inventory of the location of each storage media therein. To access a file of data in the library, the host processor must first identify the storage medium upon which the file is stored and then determine the storage cell or internal peripheral storage device in which such storage medium resides. The host processor then commands the appropriate picker controller and/or peripheral storage device controller to access the file. Should a failure cause the loss the storage media inventory, a new inventory is generated by transferring each storage medium to a peripheral storage device for its identification. In the alternative, some libraries include a vision system on a picker which allows the inventory to be generated without transferring each storage medium to a peripheral storage device. Instead, the vision system is used to identify each storage medium while it resides in a storage cell.

Commonly assigned U.S. Pat. No. 5,121,483, hereby incorporated by reference, discloses an automated storage library in which the storage media inventory is maintained in a system or library controller, similar to that in a host processor. Upon receipt of a request for access to a storage medium in the library, the library controller uses its inventory to locate the storage medium. The library controller then directs the appropriate picker controller and/or peripheral storage device controller, as required. Should a failure cause the library controller to lose its inventory, a new inventory must again be generated.

Commonly assigned U.S. Pat. No. 5,289,589, hereby incorporated by reference, discloses an automated storage library with various redundancies to improve data accessibility. The library includes two library controllers and four pickers. Each library controller maintains a storage media inventory for the entire library. Each picker has exclusive access to a set of storage cells and internal peripheral storage devices. Normally, one library controller directs the operation of two pickers and the other library controller directs the operation of the other two pickers, but each library controller is coupled to each picker. The library controllers are also coupled to each other such that both of their storage media inventories are updated as storage media and transferred about the library, regardless of the picker(s) used for the transfer operations. During a failure condition which prevents one library controller from accessing a particular storage medium, the other library controller can be signalled to attempt to access such storage medium. This is possible because both library controllers have the required storage media inventory. Should a single library controller lose its inventory, such inventory can be generated simply by accessing the inventory in the other library controller. Unfortunately, the time required to maintain two identical copies of the storage media inventory for the entire library is overhead which degrades library performance. Furthermore, such overhead increases as the activity in the library increases.

SUMMARY OF THE INVENTION

In view of the foregoing, it is the principal object of this invention to improve automated storage libraries, and methods of operation therefor.

Another object of this invention is an automated storage library which maintains storage media accessibility via multiple library controllers, yet minimizes overhead, and methods of operation therefor.

Yet another object of this invention is an automated storage library which minimizes the need to generate the storage media inventory for the entire library, and methods of operation therefor.

These and other objects of the invention are accomplished in an optical disk library having its disk inventory at the picker level. The library includes two library controllers and four pickers. Each library controller maintains a list of the storage media in the entire library, but has no disk location inventory. The library controllers are not coupled to each other. Each picker has exclusive access to a set of storage cells and internal peripheral storage devices. In addition, the picker controller for each picker maintains the disk location inventory for the disks accessible by such picker.

Normally, one library controller directs the operation of two pickers and the other library controller directs the operation of the other two pickers, but each library controller is coupled to each picker. During a failure condition which prevents one library controller from accessing a particular storage medium, the other library controller can be signalled to attempt to access such storage medium. Such access is possible because the disk inventory is maintained by the picker controller which the other library controller must direct anyway. The overhead associated with maintaining two identical copies of the inventory in the library controllers is therefore eliminated. In addition, the loss of the inventory in a single picker controller merely requires that such inventory again be generated, not the inventory for the entire library.

The foregoing and other objects, features, and advantages of the invention will be apparent from the following more particular description of the preferred embodiment of the invention, as illustrated in the accompanying drawing.

DESCRIPTION OF THE PREFERRED EMBODIMENT

Figure 1:
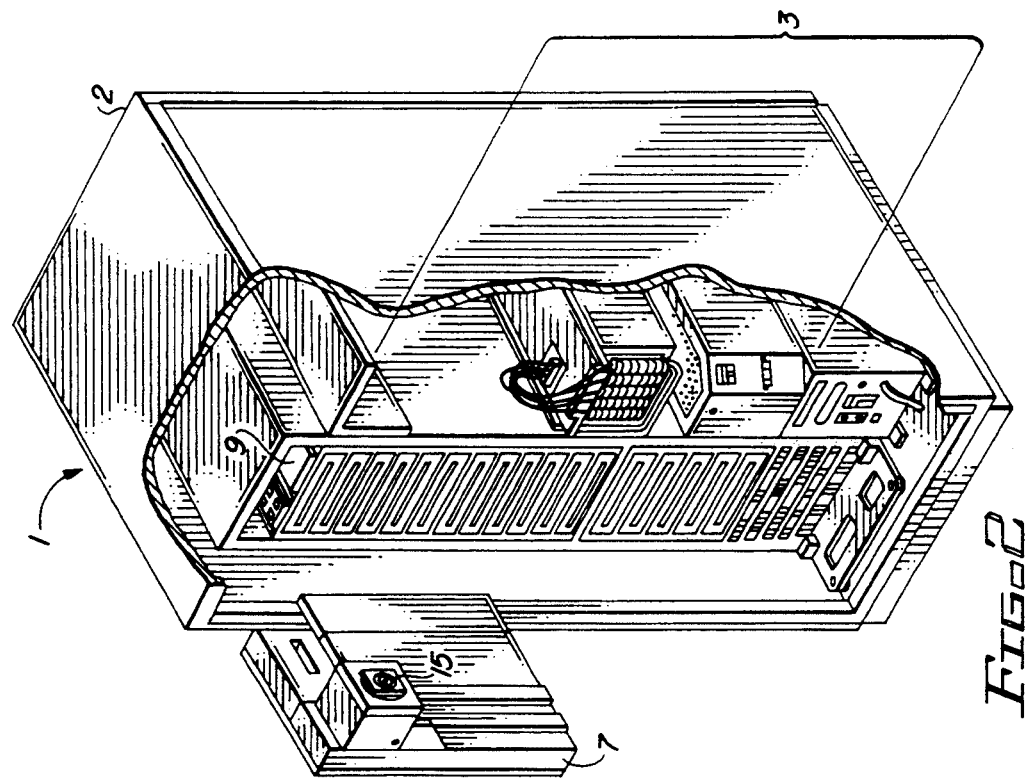
FIG. 1 is a front, perspective cut-away view of an optical disk library of the present invention.

Referring now more particularly to the drawing, like numerals denote like features and structural elements in the various figures. The automated storage library of the invention will be described as embodied in an optical disk library. Referring to FIGS. 1–4, various views of such an optical disk library are shown. The library 1 includes a housing 2 enclosing most of the working parts of the library and having front and rear door panels (not shown) for interior access. Library 1 further includes a plurality of optical disk storage cells 3 and a plurality of internal optical disk drives 4. Each storage cell 3 is capable of storing one optical disk having data recorded on one or both sides thereof. The data stored on each side of a disk is referred to as a "volume." As used hereafter, "disk" could simply be a volume on a disk. In the preferred embodiment, library 1 includes 144 storage cells 3 arranged in two 72 storage cell columns and up to four optical disk drives 4. The optical disk may include ablative, phase-change, magneto-optic, or any other optical recording layers and may be read-only, write-once, or rewritable, as is known, so long as they are compatible with optical disk drives 4. In addition, the optical disks may be recorded in a spiral or concentric track pattern. The precise recording format is not part of the subject invention and may be any known in the art. A robotic picker 5 includes a single gripper 6 capable of accessing an optical disk in any of storage cells 3 or drives 4 and transferring such optical disks therebetween. In the preferred embodiment, the optical disks are configured in cartridges for easy handling by gripper 6 and are 5 and ¼ inch form factor disks, but in alternative embodiments could by any size compatible with drives 4 and gripper 6.

Although the front face of housing 2 is not shown in FIG. 1, certain portions of library 1 protrude through such front face of housing 2 for operator access. These portions are part of a console door 7 and include all or part of a power indicator/switch 8, an entry/exit slot 9, an external optical disk drive 10, a console 11, and a keyboard 12.

Figure 2:
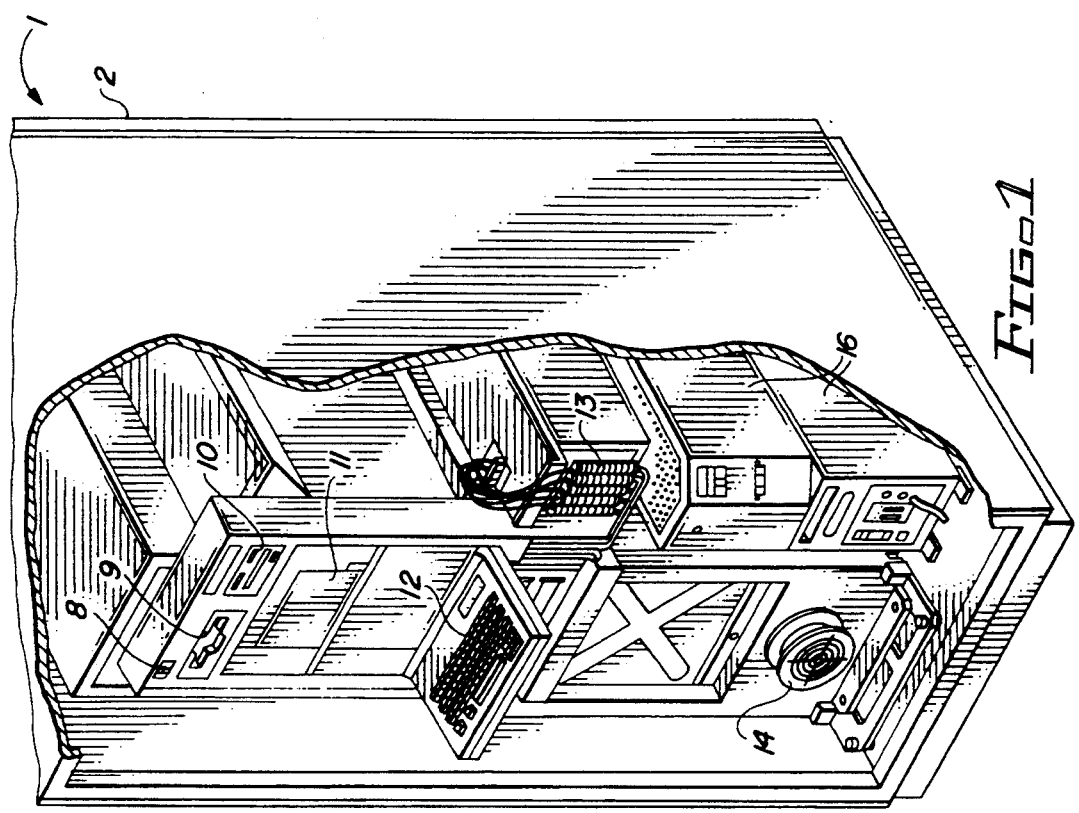
FIG. 2 is the same view as in FIG. 1 except that the console panel has been swung aside and the fan has been removed.
Figure 4:
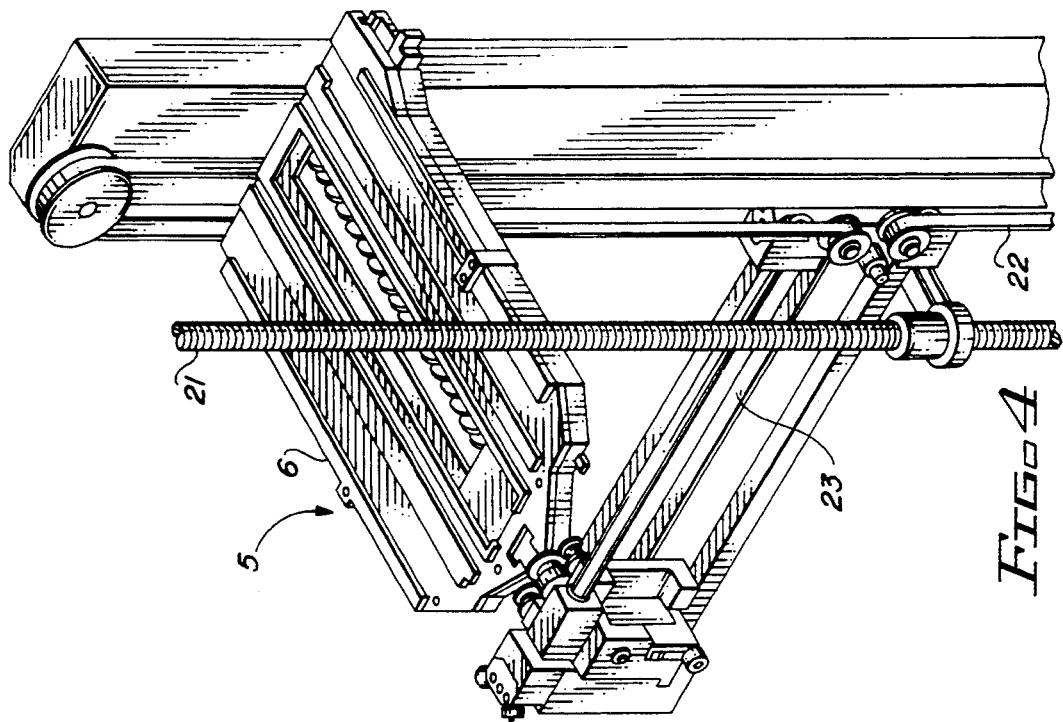
FIG. 4 is a magnified view of the robotic picker and gripper of FIG. 3.
Figure 3:
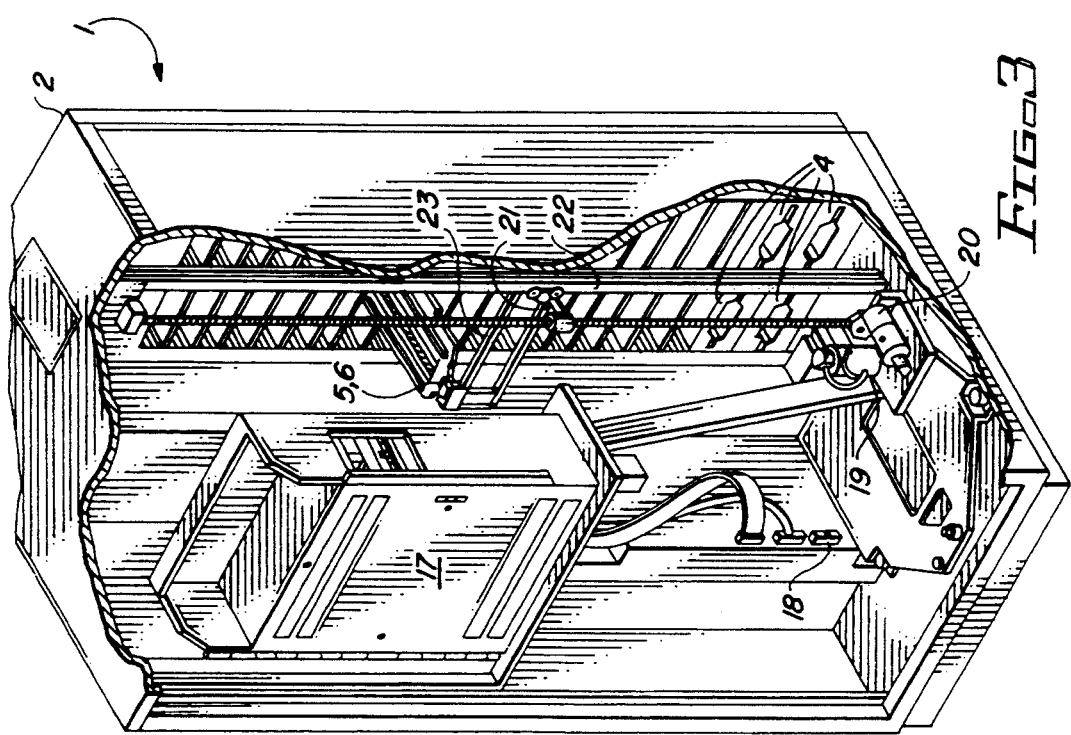
FIG. 3 is a rear, perspective cut-away view of the optical disk library of FIGS. 1 and 2.

Console door 7 can be swung aside to allow access therebehind, when necessary, as shown in FIG. 2. Slot 9 is used for inserting optical disks to or removing optical disk from library 1. Commands may be provided by an operator to library 1, via keyboard 12, to have picker 5 receive an optical disk inserted at slot 9 and transport such disk to a storage cell 3 or drive 4, or to have picker 5 retrieve an optical disk from a storage cell 3 or drive 4 and deliver such disk to slot 9 for removal from library 1. Console 11 allows an operator to monitor and control certain operations of library 1 without seeing inside housing 2. External optical disk drive 10, unlike drive 4, cannot be accessed by gripper 6. Drive 10 must instead be loaded and unloaded manually. Library 1 also includes an optical disk drive exhaust fan 14, an external disk drive exhaust fan 15, and power supplies 16.

Once library 1 is powered on, commands received at keyboard 12 are forwarded to a system or library controller 17. In the preferred embodiment, library controller 17 is an IBM PS/2 Model 80 personal computer using the OS/2 operating system. The IBM PS/2 model 80 personal computer includes main memory and one or more storage media, such as those in fixed or floppy disk drives. Library controller 17 issues instructions to drives 4, external drive 10, and picker 5 as will be described. Library controller 17 decides the drive 4 through which read/write access to an optical disk will be made and issues the appropriate instructions therefor. Drive controller cards 13 and picker 5 controller card 18 convert known small computer system interface (SCSI) command packets issued by library controller 17 into the electromechanical action of drives 4, external drive 10 and picker 5. Picker controller 18 decides where an optical disk is located and whether it must be moved, and issues the appropriate commands therefor.

A double-sided, multi-ported switch 60 is also included in library 1. The movement of picker 5 within library 1 is X-Y in nature. Movement in the vertical direction is driven by a vertical direction motor 19 and movement in the horizontal direction is driven by a horizontal direction motor 20. Motor 19 turns a lead screw 21 to move picker 5 vertically. Motor 20 turns belts 22 and 23 to move picker 5 horizontally. In addition, picker 5 may be rotated to bring either side of an optical disk within the grasp of gripper 6 to an upright position. The remaining physical features of library 1 are not shown in the drawing, or are shown but not labeled for the purpose of simplification, but are well known.

Figure 5:
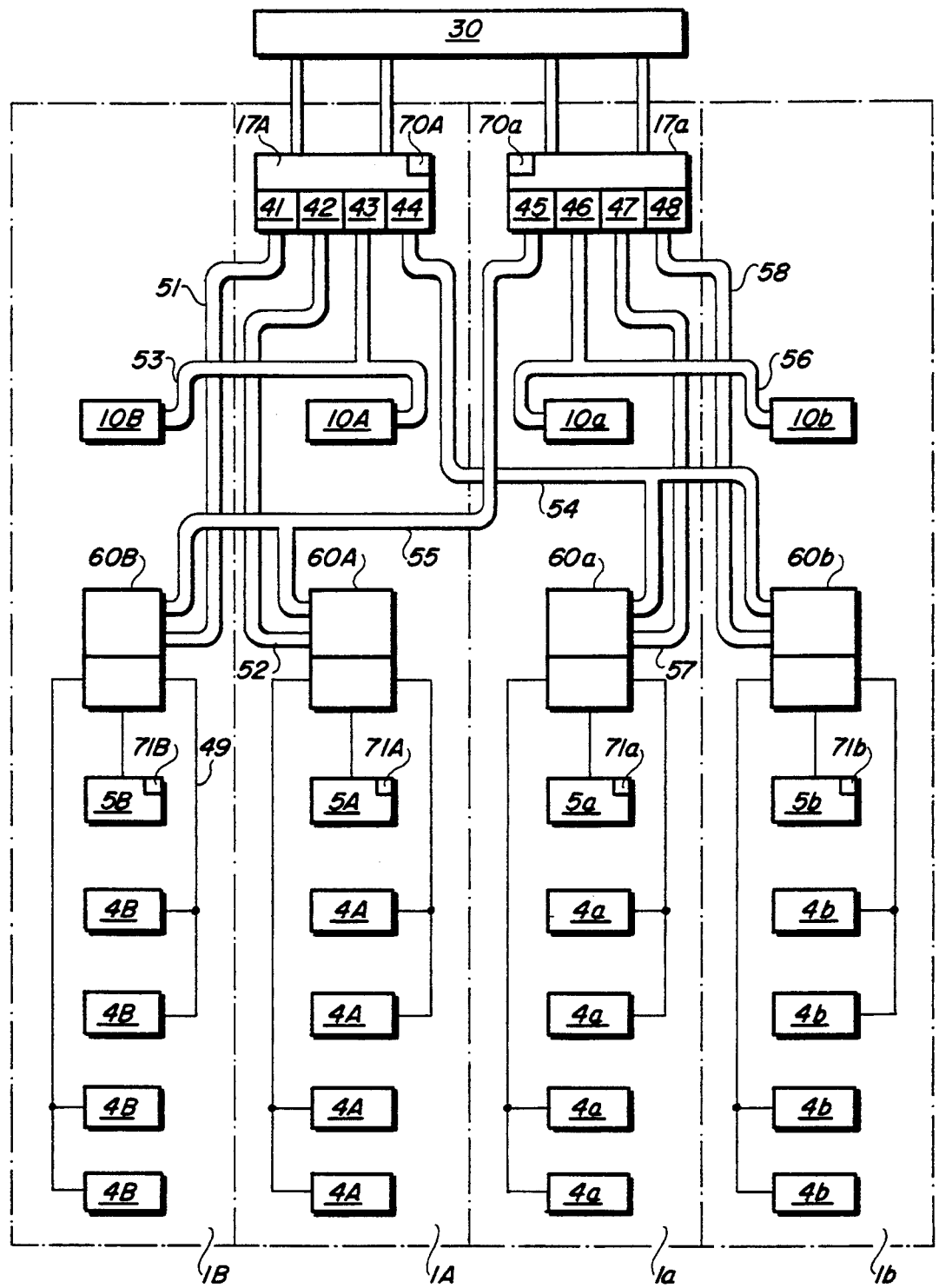
FIG. 5 is a schematic diagram of the optical disk library hardware of FIG. 1–4.

The library shown in FIGS. 1–4 is a simple single box (a self-contained, free standing unit) library configuration. Although a SCSI bus is used, no redundancy is provided as the system is relatively small. Various other library configurations are known. In the preferred embodiments, four such boxes are interconnected with some modification (as will be described) to create a library of greater storage capacity and flexibility. Referring to FIG. 5, such four box configuration library will now be described. The four boxes are schematically divided by dotted lines and are identified by numerals 1A, 1B, 1a and 1b. Boxes 1A and 1a each include a library controller, identified as 17A and 17a respectively. Boxes 1B and 1b include no library controller, instead being coupled to library controllers 17A and 17a. The design and operation of a library controller is not generally part of the present invention, except as further described herein. One important feature of the library controllers is the use of the IBM PS/2 Model 80 personal computer, as previously mentioned, because it is a commonly available component. The PS/2 Model 80 personal computer includes eight expansion slots to the motherboard therein. Four of such expansion slots are used by console 11, expanded memory and standard subcomponents of the personal computer. The remaining four expansion slots are available for coupling to the components of the library. Library controllers 17A and 17a are attached to one or more system processors 30 to receive input therefrom and to transmit output thereto. In the preferred embodiment, system processor 30 is an IBM 3090 mainframe processor using the MVS or VM operating system, the connections to which are well known. Other system processors and operating systems could also be used. Library controllers 17A and 17a are not connected to each other, but are each capable of accessing any optical disk stored in any box in the library.

Library controllers 17A and 17a each include four SCSI adapter cards, one in each of the available expansion slots therein. The SCSI adapters are identified in the drawing as 41–48 and are commonly available. Each adapter card is coupled by one of SCSI buses 51–58 to other components of the library as shown including sixteen internal optical disk drives 4A, 4B, 4a and 4b, four robotic pickers 5A, 5B, 5a and 5b, four external optical disk drives 10A, 10B, 10a and 10b, and four bidirectional, double-sided, multi-ported switches 60A, 60B, 60a and 60b. For simplicity, drive controllers 13 and picker controllers 18 are not shown in FIG. 5, but are schematically represented within the boxes identifying the drives and pickers.

In the preferred embodiment, any of SCSI adapter cards 41–48, internal optical disk drives 4A, 4B, 4a and 4b, pickers 5A, 5B, 5a and 5b, and external optical disk drives 10A, 10B, 10a and 10b may be an initiator or a target. Still referring to FIG. 5, where a particular SCSI bus 51–58 is coupled to more than one component, the components are daisy-chained so as to allow the passage of information directly to or from any of such components. Switches 60A, 60B, 60a and 60b are capable of directing information exchange between any path coupled to one side of the switch and any path coupled to the other side of the switch. For convenience, the switch sides are identified by numerals in the drawing, but are separated by a solid horizontal line in FIG. 5. The switches are double-sided and multi-ported in that both sides thereof include at least two ports for connecting separate paths of SCSI bus 50.

The library controllers and picker controllers include internal data structures which, under certain condition, allow the library controllers to access any volume in the library, yet minimize the overhead previously associated with such capability. Any format may be used for the internal data structures, as such format is not part of the invention. For the library controllers, the internal data structures are created in the PS/2 Model 80 personal computer main memory at initialization from similar files stored on the fixed disk drive of the library controllers. Two optical disk lists, 70A and 70a, are included in the internal data structures of library controllers 17A and 17a, respectively. Normally, each optical disk list includes the label of each optical disk for which the respective library controller is the primary controller (as will be described), and the particular box in the library in which such disks reside. The disk lists do not include any information as to the location of the optical disks within a particular box. As the optical disks are inserted into or withdrawn from the library, the respective optical disk list is updated via SCSI 50–58. Should a library controller lose its optical disk list, such list can be generated by querying the picker controllers.

For the picker controllers (i.e. the picker controller card 18 for each picker 5A, 5B, 5a and 5b), the internal data structures are maintained in non-volatile RAM. Such non-volatile RAM may be battery backed-up RAM, CMOS devices, or the like. Four optical disk inventories, 71A, 71B, 71a, and 71b, are included in the internal data structures of the picker controllers. Each optical disk inventory includes disk location information only for the contents of the particular box in which it is contained. The inventory includes an entry for each storage cell 3. An entry for a storage cell which is not assigned as the home storage cell for any disk is blank. An entry for a storage cell 3, which is the home storage cell for a disk, lists the owner and label of such disk, the current location of such disk, and for each volume on such disk, the volume label, the number of mounts, the available free space, and other usage statistics and information not part of the present invention. As the optical disks are inserted into, withdrawn from, or moved about a particular box in the library, the respective picker controller updates its optical disk inventory.

METHOD OF OPERATION

Figure 6:
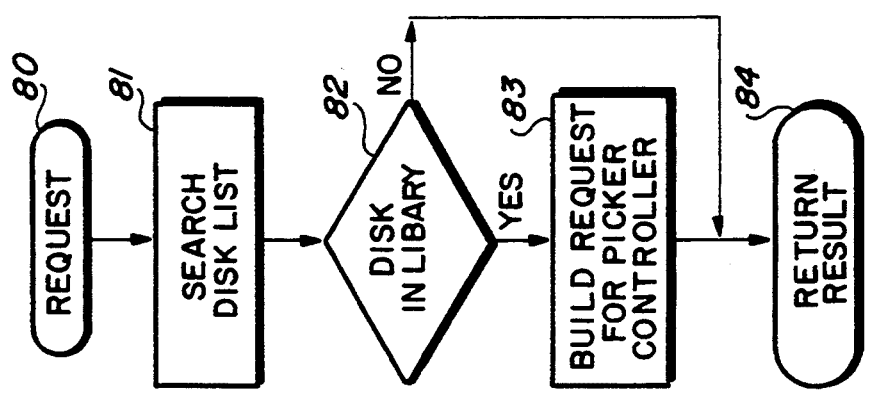
FIG. 6 is a high level flow chart of the operations of a library controller of the optical disk library.

Referring to FIG. 6, a brief overview of the operation of library controllers 17A and 17a will now be described. After receiving a request to access data in the library at step 80, the library controller identifies the optical disk for which access is requested and attempts to locate an entry for such disk in its disk list at step 81. Step 82 branches according to the result of step 81. If an entry for the requested optical disk is located, the library controller builds a request block for the appropriate picker controllers at step 83 and the results are returned at step 84. If no such entry is located, step 83 is skipped and step 84 returns with an indication that the requested optical disk is not in the library.

Figure 7:
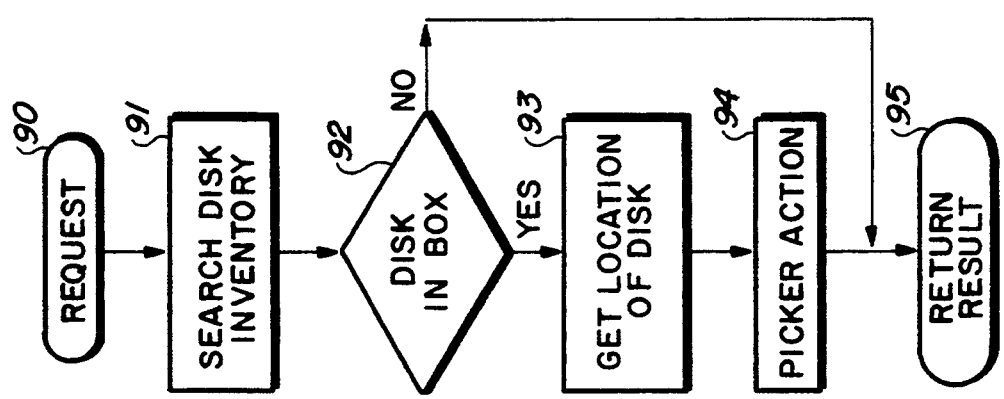
FIG. 7 is a high level flow chart of the operation of a picker controller of the optical disk library.

Referring to FIG. 7, a brief overview of the operation of the picker controllers will now be described. After receiving a request to access an optical disk (from a library controller) in its respective box at step 90, the picker controller attempts to locate an entry for such disk in its optical disk inventory at step 91. Step 92 branches according to the result of step 91. If an entry for the requested optical disk is located, the picker controller determines the location of the optical disk from such entry at step 93 and causes the picker to move the optical disk to an optical disk drive, if necessary, at step 94. The optical disk inventory of the picker controller is also updated, as required, at step 94. After the picker completes the actions required, the results are returned at step 94. If no such entry is located, step 93 and 94 are skipped and step 94 returns with an indication that the requested optical disk is not in the box.

Normally, one library controller (referred to as the "primary" library controller) directs the operation of two boxes and other library controller directs the operation of the other two boxes. As shown in FIG. 5, library controller 17A is the primary library controller for boxes 1A and 1B and library controller 17a is the primary library controller for boxes 1a and 1b. However, during a failure condition which prevents the primary library controller from accessing a particular optical disk, the secondary library controller can attempt to access the desired optical disk, as instructed by host processor 30. First, the secondary library controller queries the picker controller(s) normally directed by the primary library controller. The optical disk inventory in the picker controller(s) is used to expand the optical disk list in the secondary library controller. Access is then possible using the optical disk list in the secondary library controller and the optical disk inventory maintained by the respective picker controller.

The placement of the optical disk inventory at the picker level has several advantages. First, the hardware required to directly couple library controllers 17A and 17a to each other to maintain two identical copies of the inventory at all times is eliminated.

The overhead associated with maintaining the inventory in each library controller is also eliminated. Because the picker and its associated picker controller combine to form a single point of failure regardless of the location of the optical disk inventory, the only additional risk of inaccessibility to optical disks is from the loss of the optical disk inventory by a picker controller without an associated loss of any other function. However, the loss of the optical disk inventory in a single picker controller merely effects the accessibility of the optical disks of the respective box, not of the entire library. The optical disk inventory for the picker controller can be generated by mounting each optical disk in the respective box into an optical disk drive therein for identification.

To implement the method of operation, SCSI commands must be programmed to cause the respective library controller to inform the respective picker controller of the volume label(s) on a disk upon its insertion into the library, and to cause the respective secondary library controller to expand its disk list, as described. Further description of the structural details and operations of the library are not pertinent to the invention, but may be found in the commonly assigned U.S. Patent Applications incorporated herein.

While the invention has been described with respect to a preferred embodiment thereof, it will be understood by those skilled in the art that various changes in detail may be made therein without departing from the spirit, scope, and teaching of the invention. For example, while the invention has been disclosed in the context of an optical disk library, similar consideration may make it equally applicable to other types of automated storage libraries. In addition, numerous variations in the libraries may be made, such as the number and arrangement of drives, pickers, and storage cells. One such variation would be to embed drive controller cards 13 in drives 4 and 10. Accordingly, the invention disclosed herein is to be limited only as specified in the following claims.

What is claimed is:

1. An automated storage library for storing a first and second plurality of storage media for a host processor, the automated storage library comprising:

a library controller including means for maintaining a list of the first and second plurality of storage media;

a first and a second plurality of storage cells, each storage cell capable of storing a storage medium therein, the first plurality of storage cells capable of storing the first plurality of storage media therein and the second plurality of storage cells capable of storing the second plurality of storage media therein;

a first and a second peripheral storage device coupled to the library controller;

a first and a second automated means for transferring a storage medium between a plurality of storage cells and a peripheral storage device, the first automated means coupled to the library controller, the first automated means including means for maintaining a first inventory of the location of the first plurality of storage media in the first plurality of storage cells and in the first peripheral storage device, the first automated means incapable of transferring a storage medium to and from the second plurality of storage cells and the second peripheral storage device, the first inventory of the location of the first plurality of storage media in the first plurality of storage cells and the first peripheral storage device maintained only in the first automated means;

the second automated means coupled to the library controller, the second automated means including means for maintaining a second inventory of the location of the second plurality of storage media in the second plurality of storage cells and in the second peripheral storage device, the second automated means incapable of transferring a storage medium to and from the first plurality of storage cells and the first peripheral storage device, the second inventory of the location of the second plurality of storage media in the second plurality of storage cells and the second peripheral storage device maintained only in the second automated means;

the library controller including means, in response to a first request for access to a storage medium in the library, for determining which one of the first and second pluralities of storage media include said storage medium though the location of said storage medium remains unknown, and if the first plurality of storage media includes said storage medium, for sending a second request to access said storage medium to the first automated means, or if the second plurality of storage media includes said storage medium, for sending a second request to access said storage medium to the second automated means;

the first automated means including means, in response to the second request if the first plurality of storage media includes said storage medium, for determining the one of the first plurality of storage cells storing said storage medium using the first inventory, and for transferring said storage medium to one of the first plurality of storage devices; and the second automated means including means, in response to the second request if the second plurality of storage media includes said storage medium, for determining the one of the second plurality of storage cells storing said storage medium using the second inventory, and for transferring said storage medium to one of the second plurality of storage devices.

2. The automated storage library of claim 1 wherein the peripheral storage devices are optical disk drives and the storage media are optical disks.

3. The automated storage library of claim 1 wherein each automated means includes a robotic picker and a picker controller, the means for maintaining the first inventory being stored in the picker controller of the first automated means and the means for maintaining the second inventory being stored in the picker controller of the second automated means.

4. The automated storage library of claim 1 wherein the means for maintaining the first inventory and the means for maintaining the second inventory each include non-volatile random access memory.

5. An automated storage library for storing a first and a second plurality of storage media comprising:

a first and a second library controller;

a first and a second plurality of storage cells, each storage cell capable of storing a storage medium therein, the first plurality of storage cells capable of storing the first plurality of storage media therein and the second plurality of storage cells capable of storing the second plurality of storage media therein;

a first and a second plurality of peripheral storage devices each coupled to the first library controller and to the second library controller;

a first and a second automated means for transferring a storage medium between a plurality of storage cells and a plurality of peripheral storage devices;

the first automated means for transferring a storage medium between the first plurality of storage cells and the first plurality of peripheral storage devices, the fist automated means coupled to the first library controller and to the second library controller and including means for maintaining a first inventory of the location of the first plurality of storage media in the first plurality of storage cells and in the first plurality of peripheral storage devices, the first automated means incapable of transferring a storage medium to and from the second plurality of storage cells and the second plurality of peripheral storage devices, the inventory of the location of the first plurality of storage media in the first plurality of storage cells and the first plurality of peripheral storage devices maintained only in the first automated means;

the second automated means for transferring a storage medium between the second plurality of storage cells and the second plurality of peripheral storage devices, the second automated means coupled to the first library controller and to the second library controller and including means for maintaining a second inventory of the location of the second plurality of storage media in the second plurality of storage cells and in the second plurality of peripheral storage devices, the second automated means incapable of transferring a storage medium to and from the first plurality of storage cells and the first plurality of peripheral storage devices, the inventory of the location of the second plurality of storage media in the second plurality of storage cells and the second plurality of peripheral storage devices maintained only in the second automated means;

the first and second library controllers each including means, in response to a first request for access to a storage medium in the library, for determining which one of the first and second pluralities of storage media include said storage medium though the location of said storage medium remains unknown, and if the first plurality of storage media includes said storage medium, for sending a second request to access said storage medium to the first automated means, or if the said plurality of storage media includes said storage medium, for sending a second request to access said storage medium to the second automated means;

the first automated means including means, in response to the second request if the first plurality of storage media includes said storage medium for determining the one of the first plurality of storage cells storing said storage medium using the first inventory, and for transferring said storage medium to one of the first plurality of storage devices; and the second automated means including means, in response to the second request if the second plurality of storage media includes said storage medium, for determining the one of the second plurality of storage cells storing said storage medium using the second inventory, and for transferring said storage medium to one of the second plurality of storage devices.

6. The automated storage library of claim 5 wherein the first library controller includes means for maintaining a first list of the first plurality of storage media in the first plurality of storage cells and the second library controller includes means for maintaining a second list of the second plurality of storage media in the second plurality of storage cells.

7. The automated storage library of claim 6 further comprising means for retrieving information from the second inventory to the first library controller to expand the first list to include the second list upon the failure of the second library controller, such that the first library controller can replace the second library controller and determine, in response to a request for access to a storage medium in the library, which one of the first and second pluralities of storage media include said storage medium though the location of said storage medium remains unknown, and send a request to access said storage medium to the respective one of the first and second automated means.

8. The automated storage library of claim 5 wherein the first and second pluralities of peripheral storage devices are optical disk drives and the storage media are optical disks.

9. The automated storage library of claim 5 wherein each of the first and second automated means includes a robotic picker and a picker controller, the first automated means including the first robotic picker and the first picker controller, the means for maintaining a first inventory of the location of the first plurality of storage media in the first picker controller, the second automated means including the second robotic picker and the second picker controller, the means for maintaining a second inventory of the location of the second plurality of storage media in the second picker controller.

10. The automated storage library of claim 5 wherein the means for maintaining a first inventory includes non-volatile random access memory and the means for maintaining a second inventory includes non-volatile random access memory.

11. An automated storage library for storing first, second, third and fourth pluralities of storage media comprising:

a first library controller including means for maintaining a first list of storage media identifying the first and second pluralities of storage media, the first list maintained only in the first library controller;

a second library controller including means for maintaining a second list of storage media identifying the first and fourth pluralities of storage media, the second list maintained only in the second library controller;

first, second, third and fourth pluralities of storage cells, each storage cell capable of storing a storage medium therein, the first, second, third and fourth pluralities of storage cells capable of storing the first, second, third and fourth pluralities of storage media therein, respectively;

first, second, third and fourth pluralities of peripheral storage devices each coupled to the first library controller and to the second library controller;

first, second, third and fourth robotic pickers for transferring a storage medium between a plurality of storage cells and a plurality of peripheral storage devices, the first, second, third and fourth robotic pickers for transferring a storage medium between the first, second, third and fourth pluralities of storage cells and the first, second, third and fourth pluralities of peripheral storage devices, respectively;

first, second, third and fourth picker controllers, the first, second, third and fourth picker controllers coupled to the first, second, third and fourth robotic pickers, respectively, to the first library controller, and to the second library controller, and including means for maintaining first, second, third and fourth inventories, respectively, of the location of the first, second, third and fourth pluralities of storage media in the first, second, third and fourth pluralities of storage cells and in the first, second, third and fourth pluralities of peripheral storage devices, respectively, the first, second, third and fourth robotic picker incapable of transferring a storage medium to and from any plurality of storage cells and any plurality of peripheral storage devices other than the first, second, third and fourth pluralities of storage cells and the first, second, third and fourth pluralities of peripheral storage devices, respectively, the first, second, third and fourth inventories of the location of the first, second, third and fourth pluralities of storage media in the first, second, third and fourth pluralities of storage cells and the first, second, third and fourth pluralities of peripheral storage devices, respectively, maintained only in the first, second, third and fourth picker controller, respectively;

the first library controller including means for determining, in response to a request for access to a storage medium in the library, which one of the first and second pluralities of storage media include said storage medium though the location of said storage medium remains unknown, and if the first plurality of storage media includes said storage medium, for sending a request to access said storage medium to the first picker controller, or if the second plurality of storage media includes said storage medium for sending a request to access said storage medium to the second picker controller;

the second library controller including means for determining, in response to a request for access to a storage medium in the library, which one of the third and fourth pluralities of storage media include said storage medium though the location of said storage medium remains unknown, and if the third plurality of storage media include said storage medium, for sending a request to access said storage medium to the third picker controller, or if the fourth plurality of storage media includes said storage medium, for sending a request to access said storage medium to the fourth picker controller;

the first picker controller including means for determining, in response to a request for access to a storage medium from a library controller, the one of the first plurality of storage cells storing said storage medium using the first inventory, and for commanding the first robotic picker to transfer said storage medium to one of the first plurality of storage devices;

the second picker controller including means for determining, in response to a request for access to a storage medium from a library controller, the one of the second plurality of storage cells storing said storage medium using the second inventory, and for commanding the second robotic picker to transfer said storage medium to one of the second plurality of storage devices;

the third picker controller including means for determining, in response to a request for access to a storage medium from a library controller, the one of the third plurality of storage cells storing said storage medium using the third inventory, and for commanding the third robotic picker to transfer said storage medium to one of the third plurality of storage devices; and the fourth picker controller including means for determining, in response to a request for access to a storage medium from a library controller, the one of the fourth plurality of storage cells storing said storage medium using the fourth inventory, and for commanding the fourth robotic picker to transfer said storage medium to one of the fourth plurality of storage devices.

12. The automated storage library of claim 11 further comprising means for retrieving information from the third and fourth inventories to the first library controller to expand the first list to include the second list upon the failure of the second library controller, such that the first library controller can replace the second library controller and determine, in response to a request for access to a storage medium in the library, which one of the first, second, third and fourth pluralities of storage media include said storage medium though the location of said storage medium remains unknown, and send a request to access said storage medium to the respective one of the first, second, third and fourth picker controllers.

* * * * *

UNITED STATES PATENT AND TRADEMARK OFFICE
CERTIFICATE OF CORRECTION

PATENT NO. : 5,377,121
DATED : December 27, 1994
INVENTOR(S) : K. E. Dimitri and D. L. Willson It is certified that error appears in the above-identified patent and that said Letters Patent is hereby corrected as shown below:

```
Col.  1, Line 20    Change "includes" to --include--;
Col.  1, Line 61    Change "shown" to --known--.
Col.  3, Line 53    Change "Fig." to --Figs.--.
Col. 11, Line 37    Change "first" to --third--.
Col. 12, Line 37    Change "include" to --includes--.
```

Signed and Sealed this

Sixteenth Day of May, 1995

Attest:

BRUCE LEHMAN

Attesting Officer     Commissioner of Patents and Trademarks